United States Patent [19]

Okazaki et al.

[11] 3,899,623
[45] Aug. 12, 1975

[54] SYNTHETIC LEATHER COMBINATION OF NEEDLE-PUNCHED FABRIC AND POLYETHERESTER POLYURETHANE

[75] Inventors: Kaoru Okazaki; Kenkichi Yagi, both of Otsu; Akira Ichimura, Kyoto; Yoshinori Masubuchi, Nagoya, all of Japan

[73] Assignee: Toray Industries, Inc., Tokyo, Japan

[22] Filed: July 31, 1974

[21] Appl. No.: 493,402

Related U.S. Application Data

[63] Continuation of Ser. No. 242,819, April 10, 1972, abandoned.

[52] U.S. Cl. ............ 428/290; 260/30.4; 260/30.6; 260/30.8; 260/32.4; 260/32.6; 260/33.4; 260/75 NK; 260/75 NP; 260/77.5 AN; 427/350; 427/379; 427/381; 427/385; 427/390; 428/425
[51] Int. Cl.² ............... C08G 22/10; B44D 1/40
[58] Field of Search ........ 117/63, 138.8 F, 138.8 N, 117/138.8 UA, 72, 161 KP; 260/75 NK, 75 NP, 75 NH

[56] References Cited
UNITED STATES PATENTS

| | | | |
|---|---|---|---|
| 3,164,568 | 1/1965 | Nordt et al. | 260/75 NH |
| 3,207,709 | 9/1965 | Merten et al. | 260/2.5 AN |
| 3,399,102 | 8/1968 | Matsushita et al. | 161/64 |
| 3,520,765 | 7/1970 | Bateman | 161/84 |
| 3,531,368 | 9/1970 | Okamota et al. | 161/175 |
| 3,663,515 | 5/1972 | Hostettler et al. | 260/77.5 AN |
| 3,664,979 | 5/1972 | Tanomura et al. | 260/75 NK |
| 3,666,724 | 5/1972 | Hostettler | 260/75 NK |
| 3,686,146 | 8/1972 | Goto | 260/75 NP |
| 3,697,623 | 10/1972 | Eimers | 260/75 NH |
| 3,699,082 | 10/1972 | Koerner et al. | 260/75 NK |

*Primary Examiner*—P. E. Willis, Jr.

[57] ABSTRACT

Synthetic leather formed by impregnating non-woven fabric fibers with a linear polyurethane elastomer containing a linear block copolymer segment

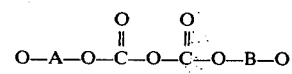

where O—A—O and O—B—O represent polytetramethylene ether glycol residue; and

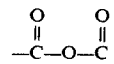

is an organic dicarboxylic acid residue.

This invention relates to synthetic leather which has improved properties and does not cause trouble in processing, such as in shoemaking and in sewing, and particularly in dyeing.

25 Claims, No Drawings

SYNTHETIC LEATHER COMBINATION OF NEEDLE-PUNCHED FABRIC AND POLYETHERESTER POLYURETHANE

This is a continuation, of application Ser. No. 242,819, filed Apr. 10, 1972, now abandoned.

BACKGROUND OF THE INVENTION

Various artificial leathers have heretofore been proposed as leather substitutes or new clothing materials. They have been based on a composite comprising non-woven fabrics and polymeric elastomers. Qualities and abilities of artificial leathers depend not only on properties of the non-woven fabric, but also on the type, physical properties and porous structure of the polymeric elastomer. Many proposals have been made concerning processes and conditions of producing non-woven fabrics and polymeric elastomers for artificial leathers, for the purpose of improving the quality and properties of artificial leather.

These proposals, however, in many cases have related only to individual investigation of the non-woven fabric or the polymeric elastomer which constitutes the artificial leather. Investigations related to prevention of difficulties in processing of artificial leather articles, such as uneven dyeing, poor easability in sewing or poor lastability in shoemaking, are, however, of critical importance.

As mentioned above, leather-like properties of an artificial leather, for example, flexibility, breathability, water vapor permeability, etc., depend upon the combined structure of the non-woven fabric and the polymeric elastomer which constitute the artificial leather. According to our investigations, every non-woven fabric is not always suitable to an artificial leather; even if a non-woven fabric is improved as much as possible, there is a limit to the properties that can be obtained. To prevent difficulty in processing artificial leather articles, we have found that the polymeric elastomer used with the non-woven fabric must be improved to achieve an artificial leather possessing good qualities and properties.

Polyurethane is usually used in the elastomer for artificial leather, either as polyether-polyurethane or polyester-polyurethane. When the former is applied to an artificial leather, the product tends to show strong repulsive elasticity and therefore to have a rubber-like feeling and touch. Also, it tends to create difficulties in processing, for example, poor easability in sewing and poor lastability in shoemaking. On the other hand, polyester-polyurethane has the essential defect of low resistance to hydrolysis. Further, the artificial leather made from this polyurethane has defects such as insufficient flexibility and a tendency to develop surface cracks and spots in dyeing. It also has insufficient easability in sewing and poor lastability in shoemaking, like the artificial leather made from polyether-polyurethane.

Polyurethanes described in British Pat. No. 1,185,418, U.S. Pat. No. 3,164,568 and U.S. Pat. No. 3,207,709 relate to polyurethanes which are superficially similar to those of the present invention, but important differences will be described as follows.

British Pat. No. 1,185,418 relates to a process for the manufacture of a polyurethane solution suitable for the production of elastic filaments, elastic films or foils, or microporous films or coatings, etc., wherein a prepolymer is produced by reaction of (a) a polyhydroxy component consisting of one linear polyester or polyether ester with terminal hydroxyl groups, of molecular weight 500 to 5000, prepared by reaction of an aliphatic dicarboxylic acid with an aliphatic diol, or diol ether, such as ethylene glycol, diethylene glycol, propylene glycol-1, 2, butane diol-1, 4, polyethylene glycol and polypropylene glycol and mixtures thereof. But this polyurethane differs from the polyurethane of the present invention in that the polytetramethylene ether glycol of the present invention is not used as a diol ether, and the ether diol chain is considerably shorter in the structure. Therefore, this polyurethane is unsuitable for an artificial leather; it does not profice an artificial leather having excellent three-dimensional curved surface formability, good easibility in sewing and good lastability in shoemaking.

Polyurethanes of U.S. Pat. No. 3,164,568 and U.S. Pat. No. 3,207,709 are also block polyether-ester-polyurethanes, but they differ from polyurethanes of this invention in that the polyether component consists of polypropyleneetherglycol. It has been determined that artificial leather made from polypropyleneetherglycol or polyethyleneetherglycol never shows good three-dimensional curved surface formability.

An object of this invention, therefore, is to provide artificial leathers which possess improved properties in processing such as good easability in sewing and good lastability in shoemaking, and improved leather-like properties generally. Another object is to provide polyurethane elastomers which can provide artificial leathers which are easy to process and which possess satisfactory leather-like properties. Other objects will be apparent from the following description of this invention.

DETAILED DESCRIPTION OF THE INVENTION

The terms "easability in sewing" and "lastability in shoemaking" in this invention are measures of the three-dimensional curved surface formability of the artificial leather products. Their values are specifically measured as later described herein.

Artificial leathers according to the present invention include not only artificial leathers which have a surface layer corresponding to the grain layer of natural leathers and are suitable for the uppers of shoes, but also include artificial leathers which do not have such a surface layer, and are suitable mainly for apparel use.

This invention is characterized by the use of a substantially linear polyurethane elastomer as the polymeric elastomer component, said polyurethane elastomer containing a block copolymer segment which comprises a polytetramethyleneether glycol residue and an organic dicarboxylic acid residue, said polytetramethyleneether glycol residue (sometimes abbreviated PTMG) having a molecular weight of at least about 1,000 and being from about 55% to about 95% of the total weight of the block copolymer segment, which has the general formula (1):

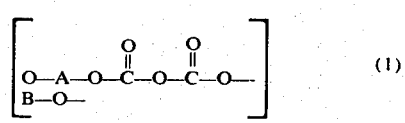

wherein —O—A—O— and —O—B—O— are the PTMG residue having a molecular weight of at least about 1,000 and when one side is a PTMG residue of the molecular weight of at least about 1,000, the other side may be a glycol residue having a molecular weight of below about 500 or a polyester glycol residue, instead of a PTMG residue, as follows:

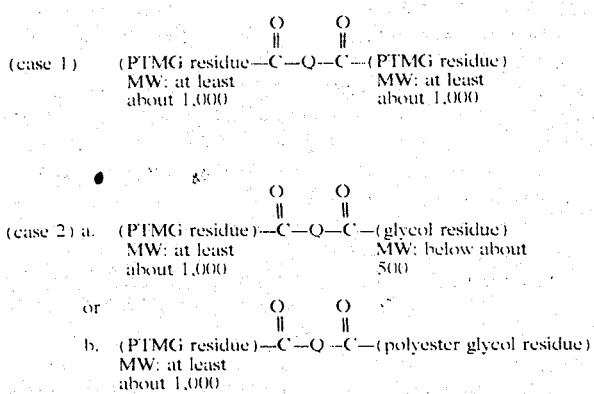

and

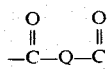

is an organic dicarboxylic acid residue selected from the group consisting of aliphatic dicarboxylic acids having a number of carbon atoms of from 2 to 10, aromatic dicarboxylic acids and ester-formable derivatives from these acids.

The block copolymer segment shown by the general formula (1), which comprises the PTMG residue having a molecular weight of at least about 1,000 and the organic dicarboxylic acid, should exist as polymer segment in the polyurethane elastomer used in this invention.

The block copolymer segment shown by the general formula (1) contains a PTMG residue connected to the next moiety by means of the organic dicarboxylic acid residue. Accordingly, the block copolymer segment is also expressed by using the terms "the PTMG-dicarboxylic acid segment" as follows. A part of the PTMG-dicarboxylic acid segment may be substituted by an organic glycol residue having a molecular weight of below about 500 and/or a polyester glycol residue.

In many cases, however, the content of the PTMG residue in the block copolymer segment shown by general formula (1), which constitutes the soft segment in polyurethane elastomer, must be from about 55% to 95%, preferably from about 65% to 95%, more preferably from about 70% to 80% of the total weight of the block copolymer segment. Besides arbitrarily chosen non-woven fabric cannot always be provided to constitute the artificial leather of this invention, as described later.

Polytetramethyleneether glycol (PTMG) used in preparation of the block copolymer segment which is one component of the polyurethane elastomer of this invention must have a molecular weight of at least about 1,000. It refers to polytetrahydrofuran which is produced by the chain-opening polymerization of tetrahydrofuran and possesses hydroxyl groups at both ends. If the molecular weight of the PTMG residue is less than about 1,000, the artificial leather made from non-woven fabric and polyurethane elastomer containing said PTMG residue will have insufficient flexibility, poor three-dimensional curved surface formability such as easability in sewing and lastability in shoemaking, and occurance of cracks or spots upon dyeing. The molecular weight of the PTMG residue used in this invention must be at least about 1,000, preferably from about 1,000 to 4,000, more preferably from about 1,200 to 3,000 in these respects. When the molecular weight of the PTMG residue is excessively high, the strength and durability of the polyurethane become lower.

When a polyether other than polytetramethyleneether glycol (PTMG), for example, polyethyleneether glycol (PEG) or polypropyleneether glycol (PPG), is applied to the polyurethane elastomer as the block copolymer segment, the artificial leather has a stiff touch and a rubber-like elasticity, and other poor leather-like properties, and does not improve in processing characteristics.

When one side of —O—A—O— or —O—B—O— of the block copolymer segment shown by the general formula (1) is the above mentioned PTMG residue, the other side may be polyester glycol or glycol of a molecular weight of below about 500. Among the polyester glycols which are useful in this invention are polyester glycols made by the condensation of organic-dicarboxylic acids, for example, succinic acid, adipic acid, sebasic acid and terephthalic acid, and low molecular weight glycols, for example, ethylene glycol, propylene glycol, 1, 4-butanediol and diethylene glycol, and polyesters made by ring opening polymerization of lactones such as epsilon-caprolactone, preferably polyethyleneadipate glycol, polybutyleneadipate glycol and poly-epsilon-caprolactone glycol. As glycols of a molecular weight below about 500, ethylene glycol, trimethylene glycol, 1, 4-butanediol, diethylene glycol, propylene glycol, hexamethylene glycol and triethylene glycol are useful. Polyesters and/or glycols of a molecular weight below about 500, however, must be used in such a range that the content of the PTMG residue in the block copolymer is in the region of about 55 – 95% by weight as mentioned later.

As aliphatic dicarboxylic acids having a number of carbon atoms of from 2 to 10 and aromatic dicarboxylic acids which constitute the block copolymer segment shown by the general formula (1), these may comprise organic dicarboxylic acids having a hydrocarbon residue such as succinic acid, malonic acid, glutaric acid, adipic acid, sebacic acid, suberic acid, phthalic acid, terephthalic acid and isophthalic acid and organic dicarboxylic acids having an oxyhydrocarbon residue such as diglycolic acid, for example. Aromatic dicarboxylic acids, such as phthalic acid, terephthalic acid and isophthalic acid are preferred in respect of the three-dimensional curved surface formability of the artificial leather.

The block copolymer segment which constitutes a soft segment in the polyurethane structure of this invention comprises the above mentioned PTMG residue, polyester glycol residue, low molecular weight glycol residue and the organic carboxylic acid residue, but the content of the PTMG residue in the block copolymer segment must be from about 55 to 95%, preferably from about 65 to 95% and more preferably from about 70 to 85% by weight in order to provide a polyurethane elastomer which can form an artificial leather having good three-dimensional curved surface formability in processing (easability of lastability) and which does not form cracks or spots in dyeing. When the content of the PTMG residue is below about 55% in the block copolymer segment, cracks and spots often occur in dyeing process of the artificial leather and the three-dimensional curved surface formability of the artificial leather becomes worse. For example, sewing defects such as seam puckering in easing or deformation after easing and shoemaking defects, such as creases at the boundary between upper and sole in lasting, or unevenness of the curved surface, occur.

On the other hand, when the content of the PTMG residue exceeds about 95% by weight in the block copolymer, the repulsive elasticity of the artificial leather becomes remarkable and, therefore, easability in sewing and lastability in shoemaking also become worse. Further, spots in dyeing tend to occur on the surface of the artificial leather.

The block copolymer segment shown by the general formula (1) is obtained from the corresponding block copolymer diol which is polymerizable using a known process. It is suitable for preparation of the block copolymer diol to react a hydroxyl terminated polytetramethyleneether glycol (PTMG) having a molecular weight at least about 1,000 with an organic dicarboxylic acid and in some cases a polyester glycol and/or a low molecular weight glycol initially at 80°–150° C, after that at 180°–250° C and finally under reduced pressure. Other processes, such as by distilling an azeotropic mixture of water and organic solvent, by bubbling nitrogen gas, by using organic dicarboxylic acid chlorides, etc. are useful.

In these processes various types of the block polyether ester glycol (block copolymer diol of this invention) are obtained by selecting different mol ratios of starting materials arbitrarily, and separating reactions into several steps. Various types of polyurethane elastomer are obtained in that way for artificial leathers. But, in any case, the block copolymer segment must have the structure in which the PTMG residue is adjacent to the organic dicarboxylic acid residue, and this block copolymer segment must contain from about 55% to about 95% by weight of the PTMG residue (soft segment) for the purpose of this invention.

The resulting hydroxyl terminated block copolymer diol is converted to polyurethane polymer by reacting said block copolymer diol with a molar excess of an organic diisocyanate to yield an isocyanate terminated intermediate called a prepolymer, dissolving said prepolymer in an organic solvent, and further reacting said prepolymer with a chain extending agent.

Organic diisocyanates which are useful for the preparation of the polyurethane elastomer include aromatic diisocyanates such as diphenyl-methane-4, 4'-diisocyanate, tolylene diisocyanate, naphthylene diisocyanate, diphenyl diisocyanate and xylylene diisocyanate, and aliphatic diisocyanates such as hexamethylene diisocyanate and lysine diisocyanate. Diphenyl-methane-4, 4'-diisocyanate

is especially preferred.

Representative chain extending agents include hydrazines, aliphatic diamines such as ethylene diamine, trimethylene diamine, propylene diamine, tetramethylene diamine, pentamethylene diamine, hexamethylene diamine, piperazine, 1, 4-diamino piperazine, N-methyl-ethylene diamine and N-methyl trimethylene diamine, aromatic diamines such as phenylene diamine, benzidine, tolylene diamine, maphthylene diamine and 4, 4'-diaminodiphenylmethane, aliphatic glycols such as ethylene glycol, propylene glycol, trimethylene glycol, 1, 4-butane diol, hexamethylene glycol and diethylene glycol, and alkanol amines. Diamines are preferred in respect of the intensity and the heat resistance of the polyurethane polymer, and, above all, aromatic primary diamines such as 4, 4'-diaminodiphenylmethane

are especially useful.

The solvent for the intermediate or prepolymer which is prepared by the reaction of the block copolymer diol with the organic diisocyanate may be an organic compound which dissolves the resulting polyurethane elastomer. Representative compounds include dimethyl acetamide, hexamethyl phosphoramide, dimethyl sulphoxide, dimethyl formamide, diethyl formamide, dioxane, tetrahydrofuran, and O-chlorophenol. Among these, dimethyl formamide, dimethyl acetamide and dimethylsulphoxide are preferred solvents, and above all, dimethyl formamide is especially useful.

For adjusting the viscosity of the polyurethane elastomer applied for the preparation of the artificial leather of this invention, compounds such as n-propyl amine, n-butyl amine, diethyl amine, di-n-propyl amine, di-n-butyl amine, aniline, ethanol, methanol and ethylene imine may be added during the preparation of the polyurethane elastomer. Viscosity is adjusted for suitability for the manufacture of the artificial leather.

Polyurethane elastomers obtained by the above mentioned process are represented by the general formula (2) as follows:

—P—CONH—R$_2$—NH—(OC—R$_1$—CONH—R$_2$—NH)$_m$—CO—

(2)

wherein P is a polymer diol residue, namely the block copolymer segment shown by the general formula (1), which contains a PTMG organic dicarboxylic acid residue; said PTMG residue having a molecular weight of at least about 1,000 and content of said PTMG in block copolymer segment being from about 55% to about 95% by weight. $R_1$ is a difunctional chain extender residue, and $R_2$ is an organic diisocyanate residue, and $m$ is an integer at least 1.

As the polyurethane elastomer of this invention, polyurethanes shown by the following general formulas (3) –(7) are preferred.

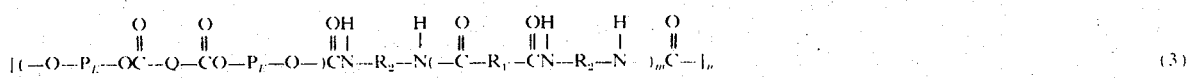  (3)

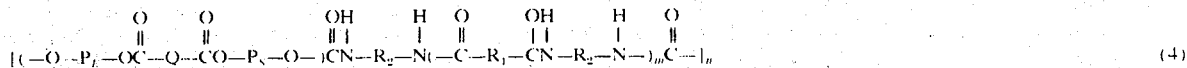  (4)

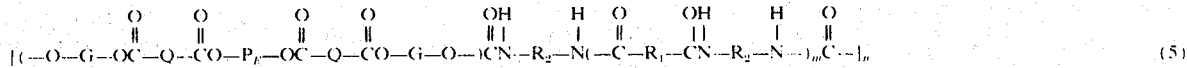  (5)

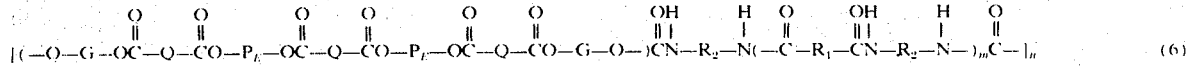  (6)

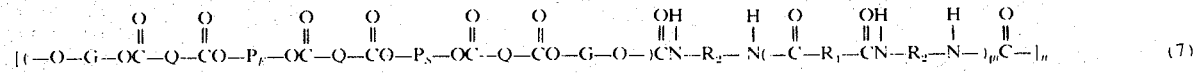  (7)

The meaning of each notation is as follows:
 O—$P_E$—O: PTMG residue of molecular weight at least about 1,000
 O—$P_S$—O: polyester glycol residue
 O—G—O: glycol residue with molecular weight of below about 500
 Q, $R_1$, $R_2$: equal to Q, $R_1$ and $R_2$ respectively in the general formula (1) and (2)
 $n, m$: integers at least 1

The content of the PTMG residue, namely O—$P_E$—O in the general formulas (3) — (7), must be from about 55% to about 95% by weight and is calculated by the following equation (8).

The content of the PTMG residue (wt. %) = $\dfrac{\text{total molecular weight of the PTMG residue in the block copolymer segment}}{\text{the molecular weight of the block copolymer segment}} \times 10$ = $\dfrac{\text{total molecular weight of O—}P_E\text{—O}}{\text{the molecular weight of P in the formula (2)}} \times 100$   (8)

In the above equation:
 PTMG = H—O—$P_E$—O—H = HO(—CH$_2$CH$_2$CH$_2$CH$_2$—O—)$_n$H block copolymer diol (polymer diol) = H—P—H
 [P: equal to P in the general formula (2)]

Polyurethane elastomers shown by the above general formulas (3) – (7) differ considerably from polyetheresterpolyurethanes known up to this time. There have been polyurethanes made from various polyetherester glycols, for example, obtained by the additional polymerization of lactones at ends of a polyether glycol, by the additional polymerization of alkyleneoxides at ends of a polyester glycol or by the random polymerization of epoxides and lactones. But they never contain the structural unit of this invention in the polyurethane structure. Artificial leather having good leather-like properties is not obtained by applying such polyurethanes to the artificial leather of this invention.

A factor influencing the ability of polyurethane elastomers of this invention to give a repressed rubber-like elasticity to the artificial leather, seems to be the influence of the PTMG-dicarboxylic acid structure units in the polyurethane structure. However, the property of forming a good three-dimensional curved surface to the artificial leather, such as good easability in sewing and good lastability in shoemaking, seems to be influenced by the PTMG residue content in the block copolymer segment in the polyurethane structure. Besides, it is surprising that the occurrence of cracks and spots is prevented in dyeing of the artificial leather.

In respect of the non-woven fabric which is another component of the artificial leather of this invention and the production of the artificial leather, not every non-woven fabric or producing method is always useful. Certain of them cannot make the most of the excellent characteristics of the polyurethane elastomers of this invention, so they cannot accomplish the purposes of this invention, namely the improvement of the leather-like properties of artificial leather. Non-woven fabrics and methods which are useful in this invention are described as follows.

Various known fibers are useful for the production of non-woven fibrous sheets of this invention, for example, various synthetic fibers of polymers such as polyamide, polyester, preferably polyethylene terephthalate, and polyacryl, also natural fibers such as wool, cotton and combinations of any of these fibers. Polymer blended fibers obtained by blending at least two different polymers and spinning, and special islands-in-a-sea fibers are also useful. Said special islands-in-a-sea fibers are obtained by spinning at least two different polymers from a single orifice and have a structure that one of the polymer elements is distributed as islands-in-the-sea of the other polymer element when seen in a cross-section of the fiber, the number of islands being at least 5, said islands respectively forming a fine (about 0.01 – 0.5 denier) filament portion which is continuous along the fiber axis. Upon dissolving the polymer element constituting the sea component by means of a solvent, the other polymer elements remain as a bundle of at least 5 fine filaments. A method of producing such islands-in-a-sea fibers is described in U.S. Pat. No. 3,531,368, in detail.

Non-woven fabrics may be prepared by a process comprising cutting the above described fibers to proper length, forming the fibers into webs by any suitable web-forming apparatus such as a random webber, cross rupper, paper making technique and filament web-forming apparatus, preferably piling said webs and then needle-punching said webs.

It is desirable to select the conditions of needle-punching such that the resulting non-woven fabric has an apparent density of about $0.05 - 0.25$ g/cm$^3$, preferably $0.12 - 0.2$ g/cm$^3$, at the thickness of $0.5 - 3.0$ mm. When the apparent density of the needle-punched web is below this region, the ligating of the fibers, the meaning of which is described in U.S. Pat. No. 3,067,482, becomes insufficient and the artificial leather comprising such non-woven fabric and the polyurethane elastomer of this invention tends to develop cracks in dyeing and to show poor three-dimensional curved surface formability, such as deformation. On the other hand, excessively high apparent density brings inflexibility to the artificial leather and causes a rubber-like feeling, so the three-dimensional curved surface formability such as the easability and the lastability suffer.

Adequate conditions of needle-punching to get the desirable region of the apparent density as above described are obtained by a suitable combination of various elements, for example, the number of needle barbs, the depth of needle barbs and the number of total punches. Generally the number of needle barbs is $1 - 9$, the depth of needle barb is $30 - 200$ microns and the number of total punches is $200 - 10,000$ punches per square centimeter. When needles with a low number of barbs such as 1 barb are selected, another requisite condition of needle-punching to obtain a well-ligating non-woven fabric of high density is to increase the barb depth of the needles or to increase the munber of punches. But an excessive increase in the depth of the needle barbs (above 200 microns) tends to create punch marks on the surface, and an excessive increase in the number of total punches causes the scission of fibers. Therefore, intensity of the non-woven fabric decreases. On the other hand, it is desirable to use needles with the increased barb depth or to decrease the number of total punches when needles with many barbs are used. But an excessive decrease in the depth of needle barbs (below 30 microns) makes the non-woven fabric insufficient in ligating, and an excessive decrease in the number of total punches never raises the density of the non-woven fabric and tends to cause cracks on the surface of artificial leather made from such non-woven fabrics. It is important to establish suitable conditions of needle-punching to obtain the region of the non-woven fabric density satisfying the objects of this invention by the combination of these needling elements.

There are other relevant needling conditions, such as the position of barbs, the angle of barbs and the shape of barbs, which influence the properties of the non-woven fabrics. Desirable needling conditions vary with the kinds of textile fibers.

There are many variable elements of needling conditions like this and it is very complicated to combine them suitably. The artificial leathers, however, which have a good three dimensional curved surface formability of the purpose of this invention may be obtained by use of the non-woven fabrics in which fibers are sufficiently ligated, therefore, it is required that the apparent density of non-woven fabrics is in the above described density range.

There are various methods for producing artificial leathers comprising the above described needle-punched non-woven fabrics and the polyurethane elastomers of this invention. One of the representative methods comprises impregnating a fibrous sheet such as punched felt obtained by needle-punching a non-woven web or fabric with the polyurethane elastomer composition of this invention and evaporating the solvent or wet-coagulating to obtain the impregnated sheet. Another representative method comprises coating the polyurethane elastomer composition of this invention on said impregnated sheet or other fibrous sheet, and evaporating the solvent or wet-coagulating the obtain artificial leather with a surface layer made from a dry coagulated film or a wet-coagulated film. These sheets are suitable for apparel use or for shoe uppers and are formed in a suitable thickness corresponding to each application by slicing and buffing. Among these the wet-coagulating method is a preferred method for artificial leather of this invention; any known wet-coagulating method is applicable to the artificial leather of this invention. In this case, however, some limitations apply as follows.

Suitable ratios of the impregnated polyurethane elastomer weight to the non-woven fabric weight are in the range of about $30 - 150/100$, preferably $40 - 100/100$ though it varies with the kind of fibers constituting the non-woven fabric, or with the apparent density of the non-woven fabric. For that purpose, the proper concentration of the polyurethane elastomer composition is in the range of about $5 - 25\%$, preferably $10 - 20\%$ by weight.

When the above mentioned islands-in-a-sea fiber is used as the component fiber of the non-woven fabric of this invention, a more suitable process for producing the composite sheet comprises setting said non-woven fabric with a water-soluble binder such as polyvinyl alcohol, starch or carboxymethylcellulose in an aqueous solution having a concentration of about $5 - 25\%$ by weight, drying said non-woven fabric, extracting the sea component of the fiber to form a bundle of fiber filaments with a solvent which is a solvent for the sea component and a non-solvent for the binder and island component fibers, thereafter impregnating said bound sheet with the polyurethane elastomer composition of this invention, and extracting said water-soluble binder. The resulting artificial leather sheet has sufficient flexibility and good three-dimensional curved surface formability, and is very suitable for apparel use, leather-like materials similar to natural suede leathers.

The artificial leather materials of this invention are processed by dyeing, sewing and shoemaking to form commercial products such as shoes, bags, leather-like sheets and leather-like clothing.

As one of the objects of this invention is to prepare polyurethane compositions which create an artificial leather sheet having good easability in sewing and good lastability in shoemaking, we have investigated what properties of the sheets influence said easibility and lastability. Both easing and lasting are the processes which provide a beautiful three-dimensional curved surface for the sheet and both appear to depend on the same kinds of physical properties, for example, elastic properties of sheets such as repulsive elasticity, compressive elasticity and bending elasticity, and still more recovery characteristics of the sheets.

The reason why artificial leathers up to the present have been reputed rubber-like is caused by a strong repulsive elasticity. Such property is improved by use of the polyurethane elastomer containing the structure units of a PTMG-dicarboxylic acid residue. However, improvement in such repulsive elasticity, however, can never provide an artificial leather having a good easability and lastability which are the objects of this invention. That is, an extreme decrease in repulsive elasticity makes the sheets paper-like. On this point, the recovery characteristic of the sheets is also improtant in obtaining a leather-like property, and it is required in order to give the recovery characteristic in which both elastic recovery and plastic recovery balance properly in order to obtain three-dimensional processable sheets. It seems that the content of the PTMG residue in the block copolymer segment of the polyurethane elastomer of this invention relates to such desirable recovery characteristic.

According to the invention, it becomes clear that the residual strain measured by Bally's Tensometer after a given period corresponds to the quality of the easability or the lastability of the artificial leather. So the three-dimensional curved surface formability of artificial leathers made from various polyurethane elastomer compositions are expressed by the values of the residual strain and it becomes quantitatively clear that the polyurethane elastomer containing the PTMG residue in an extent of this invention is most effective to the three-dimensional curved surface formability of the artificial leather.

The invention is further illustrated by the following examples in which parts are given by weight unless otherwise specified and the measurements of "flexibility", "repulsive elasticity", "recovery characteristic in curved surface", "easability and lastability", and "spots and cracks in dyeing" in each example are described as follows.

"Flexibility" is defined as the forcing grams required to bend, through a deflection of 2 mm, a sample of 2 cm × 5 cm, which sample is restrained at spaced points 1 cm apart at a common level. The bending is accomplished by a pull rod which contacts the sample midway between the spaced points and the pull rod is preferably connected to a load cell to measure the required force. One such apparatus is the "Shimazu Autograph IS-2000".

"Repulsive elasticity" is defined as an arc length whose measurement comprises folding a sample (2 cm × 10 cm) quadruple, maintaining the folded sample under a load of 4 Kg for 5 minutes and drawing an arc with a substance which weights 25 g and is hung from fulcrums at a distance 50 cm apart, by the recovery force of the folded sample (the value of repulsive elasticity is about 0.5 – 1.0 cm in natural suede leather).

"Recovery characteristic in curved surface" is a measure of the three-dimensional curved surface formability, whose measurement comprises setting on a level a circular sample having a diameter of 7 cm on Bally's Tensometer under 25% extension, pressing from the rear to raise the top of the curved surface of the sample 15 mm from the original level, removing the pressure after 5 minutes, and reading the residual strain after 24 hours. According to our investigation, the values of residual strain of the sheets having a good three-dimensional curved surface formability are in the area of about 60 – 70%.

"Easability and lastability" are judged by practical application to sewing and shoemaking processes. The standard of judgment is commented upon in Table 1.

"Spots and cracks" are graded into five classes corresponding to the degree of occurrence. Class 5 indicates no occurrences and Class 1 indicates frequent occurrences.

Table 1

Standard of Easability and Lastibility

| Class | Easability in sewing | Lastability in shoemaking | Judgement |
|---|---|---|---|
| 5 | Excellent and beautiful three-dimensional curved surface is formed. | Excellent and beautiful three-dimensional curved surface is formed. | Good |
| 4 | Good and no trouble occurs. | Good and no trouble occurs. | Good |
| 3 | Good, but seam puckerings or unevenesses on the curved surface occur slightly. | Good, but unevenesses on the curved surface occur slightly. | Good |
| 2 | Poor, and puckerings, unevenesses or deformations are clear. | Poor, and unevenesses or deformations are clear. | Poor |
| 1 | Difficult, and above defects are remarkable. | Difficult, and above defects are remarkable. | Poor |

EXAMPLE I

A. Preparation of Polyurethane Composition

Various mixtures of phthalic acid and polytetramethyleneether glycols of various molecular weights in various mol ratios shown in Table 2 were reacted for 5 hours at 190° C, during which time water produced by the polycondensation reaction was removed by a stream of nitrogen. Further condensation was then performed for 10 hours at 190°–195° C/4 – 6 mmHg.

In each experiment No. 1–No. 5, further 1, 4-butanediol was added to each resulting product, then each mixture was reacted for 2 hours at 190°– 195° C and then 10 hours at 200° C/4 – 6 mmHg.

The content of the PTMG residue in each resulting block copolymer segment is shown in Table 2.

1 mol of each block copolymerdiol was reacted with 2 mols of diphenylmethane-4, 4'-diisocyanate for 2 hours at 80° C. After dissolving each product in dimethyl formamide to give a solution of 50% by weight, the mixture of 1 mol of 4, 4'-diaminodiphenylmethane and dimethyl formamide was added slowly to each 50% solution to give a 25% solution. After keeping overnight to react perfectly, further dimethyl formamide was added to each 25% solution to give various polyurethane compositions of 15% by weight of this invention.

B. Preparation of Dyed Impregnated Sheet

A non-woven web was made from polyethyleneterephthalate staple of 1.25 denier and fiber length of 38 mm and it was processed by needle punching at a density of 3,500 punches/cm² with 1-barb needles to produce a non-woven fabric of density 0.15 g/cm³ and of thickness 2.2 mm. Said non-woven fabric was immersed for 1 hour in each of the above mentioned polyurethane elastomer compositions of a concentration of 15% of this invention, then squeezed between rollers at a clearance of 1.05 mm and coagulated with water for ½ hour. Then each coagulated sheet was washed with hot water for 1 hour and dried for 1 hour at 100° C to give each impregnated sheet shown in Table 2.

sponding base material for artificial leather was put upon said coated layer. After drying for 2 hours at 100° C, each dried sheet was stripped from the glass plate to produce an artificial leather having a surface layer. The physical properties of each artificial leather are shown in Table 2.

Table 2 (Example I)

| Exp. No. | MW of PTMG residue | Block Copolymer Segment Mol ratio PTMG | Block Copolymer Segment Mol ratio PA | Block Copolymer Segment Mol ratio BD | Content of PTMG residue (wt %) | Properties of Dyed Impregnated Sheet Flexibility (g) | Properties of Dyed Impregnated Sheet Repulsive Elasticity (cm) | Properties of Dyed Impregnated Sheet Recovery Characteristic in Curved Surface (%) | Properties of Dyed Impregnated Sheet Easability in Sewing (class) | Properties of Dyed Impregnated Sheet Spots in dyeing (class) | Properties of Artificial Leather Flexibility (g) | Properties of Artificial Leather Repulsive Elasticity (cm) | Properties of Artificial Leather Recovery Characteristic in Curved Surface (%) | Properties of Artificial Leather Lastability in Shoemaking (class) |
|---|---|---|---|---|---|---|---|---|---|---|---|---|---|---|
| This Invention | | | | | | | | | | | | | | |
| 1 | 1,210 | 1 | 2 | 2 | 74 | 108 | 1.1 | 65 | 5 | 5 | 195 | 2.8 | 64 | 5 |
| 2 | 1,580 | 1 | 2 | 2 | 78 | 112 | 0.8 | 65 | 5 | 5 | 186 | 2.6 | 65 | 5 |
| 3 | 2,050 | 1 | 2 | 2 | 82 | 105 | 0.9 | 64 | 5 | 5 | 198 | 2.9 | 64 | 5 |
| 4 | 1,210 | 2 | 3 | 2 | 81 | 118 | 1.8 | 64 | 5 | 5 | 202 | 2.8 | 64 | 5 |
| 5 | 1,750 | 2 | 3 | 2 | 86 | 120 | 2.5 | 63 | 4 | 4 | 210 | 3.0 | 62 | 4 |
| 6 | 1,050 | 2 | 1 | — | 94 | 131 | 3.0 | 61 | 4 | 4 | 280 | 4.1 | 60 | 4 |
| Comparison | | | | | | | | | | | | | | |
| a | 2,100 | 2 | 1 | — | 97 | 155 | 3.8 | 52 | 2 | 3 | 340 | 4.5 | 51 | 2 |
| b | 1,500 | 1 | 1 | — | 97 | 167 | 3.6 | 50 | 2 | 3 | 330 | 4.6 | 51 | 2 |
|   | 2,700 | 1 | | | | | | | | | | | | |

PTMG: Polytetramethyleneether glycol
PA: Phthalic acid
BD: 1,4-Butane diol
MW: molecular weight
wt%: % by weight Table 2. Each impregnated sheet contained 60 parts of polyurethane elastomer to 100 parts of fiber and was sliced into a thickness of 0.9 mm. Then each sheet was dyed in a dye bath containing 3% of Kayalon polyester Gray NG (Nippon Kayaku) for 1 hour at 130° C and soaped in a soaping agent containing "Amiladin D" (Dai-ichi Kogyo Seiyaku) 1g/liter, hydrosulphile 1 g/liter and sodium hydroxide 1 g/liter for 20 minutes at 80° C to give a dyed impregnated sheet.

Properties of each dyed sheet are shown in Table 2.

C. Preparation of Artificial Leather with a Surface Layer

Each above mentioned impregnated sheet was sliced into a thickness of 1.5 mm to give a base material for the artificial leather with a surface layer.

The coating composition for the surface layer was as follows:

| | | |
|---|---|---|
| Polyurethane 25 parts | | |
| DMF 75 parts | solution | 56.50 parts |
| PVC$^{100}$/DOP$^{50}$ 30 parts | | |
| DMF 70 parts | solution | 7.59 parts |
| aq. solution of 14.3% of Lithium chloride | | 7.3 parts |
| Hydroxyl propyl cellulose 15 parts | | |
| DMF 85 parts | solution | 12.56 parts |
| DMF dispersion of 18% of carbon black | | 1.26 parts |
| DMF | | 15.07 parts | wherein PVC: polyvinyl chloride
DOP: dioctylphthalate
DMF: dimethyl formamide

Various coating compositions corresponding to the above mentioned polyurethane elastomer compositions were prepared. Each coating composition was uniformly coated on a glass plate with a coating blade having a coating clearance of 1.5 mm and coagulated in water for ½ hour and dried. Then further the same composition was coated on this with a coating blade having a coating clearance of 0.2 mm, and the corre- It is clear from Table 2 that the dyed impregnated sheets of experiments No. 1 – No. 6 of this invention showed low repulsive elasticity and good casability in sewing corresponding to a proper value of recovery characteristic in the curved surface. On the other hand, the sheets of experiments No. a and No. b deviating from this invention showed permissible flexibility and repulsive elasticity, but poor easability in sewing. Besides, the results according to this invention were excellent since there was little occurrence of spots in dyeing. The artificial leathers of this invention showed better lastability than the comparative samples. Runs No. 1 – No. 6 of this invention, especially the No. 1 – No. 4 showed a product having a beautiful three-dimensional curved surface.

EXAMPLE II

Polytetramethyleneether glycol, polyester glycol and phthalic acid were reacted in various mol ratios as shown in Table 3 for 7 hours at 180° C, during which time water produced by the condensation reaction was removed by a stream of nitrogen. Further condensation was then performed for 2 hours at 195°– 200°C/4 – 6 mm Hg. In each of the experiments No. 8 and No. 10 of this invention and No. c of comparison, further 1, 4-butanediol was added to each resulting product, then each mixture was reacted for 5 hours at 180° C, then for 2 hours at 195°–200° C/100 mmHg and for 2 hours at 195°–200° C/30 mmHg, and finally for 10 hours at 200° C/4 – 6 mmHg to give a block copolymerdiol having the PTMG residue content shown in Table 3.

1 mol of each block copolymerdiol was reacted with 2 mols of diphenylmethane-4, 4'-diisobyanate for 2 hours at 80° C and the resulting prepolymer was dissolved in dimethyl acetamide to give a 50% solution by weight. Than a mixture of 1 mol of 4, 4'-diaminodiphenylmethane and dimethyl acetamide was added slowly to each 50% solution to give a 25% solution. After keeping overnight to react completely, the 25% compositions and further 15% compositions of this invention were obtained in accordance with Example I.

The dyed impregnated sheet and the artificial leather with a surface layer were prepared from each composition of this invention and comparison was made in accordance with Example I. Physical properties appear in Table 3.

various mol ratios in accordance with Examples I and II. The dyed impregnated sheets of Table 4 were prepared from these compositions by the method B in Example I.

The dyed sheets of tests Nos. 13 and 14 are examples using aliphatic dicarboxylic acids and were slightly inferior to the sheets of tests Nos. 12 and 16 using an aromatic dicarboxylic acid, as respects easability. Among them, the sheet of test No. 12 using a diphenylmethane-4,4'-diisocyanate showed more beautiful curved sur- Table 3 (Example II)

| Exp. No. | Poly-ester Type MW | Block Copolymer Segment | | | | | Content of PTMG residue (wt %) | Properties of Dyed Impregnated Sheet | | | | | Properties of Artificial Leather | | | |
|---|---|---|---|---|---|---|---|---|---|---|---|---|---|---|---|---|
| | | PTMG MW | Mol ratio | | | | | Flexibility (g) | Repulsive Elasticity (cm) | Recovery Characteristic in Curved Surface (%) | Easability in Sewing (class) | Cracks in Dyeing (class) | Flexibility (g) | Repulsive Elasticity (cm) | Recovery Characteristic in Curved Surface (%) | Lastibility in Shoemaking (class) |
| | | | PTMG | Ps | PA | BD | | | | | | | | | | |
| This Invention | | | | | | | | | | | | | | | | |
| 7 | PCL 570 | 2,260 | 1 | 1 | 1 | — | 77 | 102 | 0.9 | 64 | 5 | 5 | 187 | 2.2 | 63 | 5 |
| 8 | PEA 300 | 2,120 | 1 | 1 | 3 | 2 | 70 | 112 | 1.4 | 65 | 5 | 5 | 192 | 2.9 | 64 | 5 |
| 9 | PBA 650 | 1,560 | 1 | 1 | 1 | — | 67 | 118 | 1.2 | 65 | 4 | 5 | 196 | 2.5 | 66 | 4 |
| 10 | PCL 520 | 1,650 | 1 | 1 | 3 | 2 | 60 | 105 | 0.8 | 71 | 3 | 4 | 185 | 2.3 | 68 | 3 |
| 11 | PEA 1,050 | 1,560 | 1 | 1 | 1 | — | 57 | 120 | 1.2 | 72 | 3 | 4 | 202 | 2.7 | 70 | 3 |
| Comparison | | | | | | | | | | | | | | | | |
| c | PEA 300 | 1,050 | 1 | 1 | 3 | 2 | 50 | 160 | 1.5 | 80 | 2 | 2 | 210 | 3.1 | 76 | 2 |
| d | PCL 1,300 | 1,560 | 1 | 1 | 1 | — | 52 | 158 | 1.1 | 77 | 2 | 2 | 190 | 2.2 | 78 | 2 |

PCL: Poly-ε-caprolactone
PEA: Polyethyleneadipate
PBA: Polybutyleneadipate
Ps: Polyester glycol It is clear from Table 3 that the dyed impregnated sheets of runs No. 7–No. 11 of this invention showed a proper value of recovery characteristics in the curved surface, and showed good easability in sewing correspondingly. On the other hand, the dyed sheets of comparisons c and d showed poor easability in sewing and still more noticeable cracks on the surface. The artificial leathers of this invention showed better lastability than the comparative samples. In these tests of this invention, the curved surface formability of tests 7, 8 and 9 were better than those of 10 and 11. Especially, those of Nos. 7 and 8 were excellent.

EXAMPLE III

Various polyurethane compositions shown in Table 4 were prepared from various starting materials and in face than that of No. 16 using a tolylene diisocyanate. The sheet of example No. 14 using an aliphatic diamine was slightly inferior to that of No. 13 using an aromatic diamine with respect to dye spots. No. 15 was an example using a glycol as the chain extender and was inferior to examples using diamines with respect to easability in sewing and cracks in dyeing. No. 17 was an example using an aliphatic diisocyanate. A few spots occurred on the surface of the sheet. Though these examples of this invention had some defects, they showed effective three-dimensional curved surface formability and dyeing properties which were the objects of this invention. On the other hand, comparisons Nos. e and g using a polyether glycol other than polytetramethyleneether glycol and comparison f using only polyester glycol did not accomplish the objects of this invention.

Table 4 (Example III)

| Exp. No. | Block Copolymer Segment | | | | | | | | Polyurethane Composition | | | |
|---|---|---|---|---|---|---|---|---|---|---|---|---|
| | M.W. | | Di-carboxylic acid (DA) | Glycol (G) | Mol Ratio | | | Content of PTMG residue (wt %) | Di-isocyanate (DI) | Chain Extender (CE) | Solvent | Mol Ratio |
| | Polyether (Pe) | Polyester (Ps) | | | Pe | PS | DA | G | | | | | Block Copolymer Diol | DI | CE |
| This Invention | | | | | | | | | | | | | |
| 12 | PTMG 1210 | — | PA | EG | — | 2 | 2 | 76 | MDI | MBA | DMF | 1 | 2 | 1 |
| 13 | PTMG 1210 | — | AA | EG | 1 | — | 2 | 2 | 78 | MDI | MBA | DMF | 1 | 2 | 1 |
| 14 | PTMG 1740 | — | SbA | BD | 1 | — | 3 | 2 | 72 | MDI | EDA | DMAC | 1 | 2 | 1 |
| 15 | PTMG 1210 | PEA | PA | BD | 1 | — | 2 | 2 | 75 | MDI | BD | DMF | 1 | 3 | 2 |

Table 4 (Example III) — Continued

| Exp. No. | M.W. Poly-ether (Pe) | M.W. Poly-ester (Ps) | Di-car-boxy-lic acid (DA) | Gly-col (G) | Mol Ratio Pe | Mol Ratio PS | Mol Ratio DA | Mol Ratio G | Content of PTMG residue (wt %) | Di-iso-cya-nate (DI) | Chain Ex-tend-er (CE) | Sol-vent | Mol Ratio Block Co-polymer Diol | Mol Ratio DI | Mol Ratio CE |
|---|---|---|---|---|---|---|---|---|---|---|---|---|---|---|---|
| 16 | 1550 PTMG | 520 PEA | PA | — | 1 | 1 | 1 | — | 71 | TDI | MBA | DMSO | 1 | 2 | 1 |
| 17 | 1550 PTMG | 520 PEA | PA | — | 1 | 1 | 1 | — | 71 | HMDI | MBA | DMSO | 1 | 2 | 1 |
| Comparison | | | | | | | | | | | | | | | |
| e | 2010 PPG | — | — | — | 1 | — | — | — | 0 | MDI | MBA | DMF | 1 | 2 | 3 |
| f | — | 2010 PEA | — | — | — | 1 | — | — | 0 | MDI | MBA | DMF | 1 | 2 | 1 |
| g | 1550 PEG | 520 PCL | PA | — | 1 | 1 | 1 | — | 0 | MDI | MBA | DMF | 1 | 2 | 1 |

PTMG: polytetramethyleneether glycol  
PPG : polypropyleneether glycol  
PEG : polyethyleneether glycol  
PA : phthalic acid  
AA : adipic acid  
SbA : sebacic acid  
EG : ethylene glycol  
DMAC: dimethyl acetamide  
DMSO: dimethyl sulphoxide BD : 4,4-butane diol  
MDI : diphenylmethane-4, 4'-diisobyanate  
TDI : tolylene-diisocyanate (2, 4-type/2, 6- type = 80/20)  
HMDI : hexamethylene-diisocyanate  
EDA : ethylene diamine  
MBA : 4, 4'-diaminodiphenylmethane  
DMF : dimethyl formamide

EXAMPLE IV

Various block copolymerdiols shown in Table 5 were prepared from polytetramethyleneether glycols of different molecular weights in accordance with Examples I and II.

1 mol of each block copolymerdiol was reacted with 2 mols of diphenylmethane-4, 4'-diisocyanate for 2 hours at 80° C, the resulting prepolymer was dissolved in dimethyl formamide to give a 50% solution by weight, then the mixture of 1 mol of phenylene diamine and dimethyl formamide was added slowly to each 50% solution to give a 25% solution. After keeping overnight to react completely, further dimethyl formamide was added to each 25% solution to give 15% compositions of this invention and the comparison.

The dyed impregnated sheets of Table 5 were prepared from these compositions by method B in Example I.

Runs h and i of the comparison using polytetramethyleneether glycols of molecular weight of below 1,000 showed poor easability in sewing and spots and cracks in dyeing. On the other hand, tests 19 – 22 were better than No. 18 using a polytetramethyleneether glycol of a molecular weight of above 4,000 and especially No. 20 and No. 21 showed excellent three-dimensional curved surface formability and dyeing properties.

Table 5 (Example IV)

| Exp. No. | M.W. PTMG | M.W. Poly-ester (Ps) | Dicar-boxylic acid (DA) | Gly-col (G) | Mol ratio PTMG | Mol ratio Ps | Mol ratio DA | Mol ratio G | Content of PTMG residue (wt%) | Flexi-bility (g) | Repulsive Elasticity (cm) | Recovery Characteristic in Curved Surface (%) | Easability in Sewing (class) | Dyeing Spots | Dyeing Cracks |
|---|---|---|---|---|---|---|---|---|---|---|---|---|---|---|---|
| 18 | 4,200 | PCL 600 | PA | EG | 1 | 1 | 3 | 2 | 79 | 118 | 2.3 | 61 | 3 | 3 | 3 |
| 19 | 3,500 | PCL 1,200 | PA | — | 1 | 1 | 1 | — | 73 | 107 | 2.2 | 63 | 4 | 4 | 4 |
| 20 | 2,500 | PCL 850 | PA | — | 1 | 1 | 1 | — | 72 | 110 | 1.8 | 65 | 5 | 5 | 5 |

Table 5 (Example IV) — Continued

| 21 | 1,250 | — | PA | BD | 1 | — | 2 | 2 | 74 | 115 | 1.5 | 64 | 5 | 5 | 5 |
| 22 | 1,100 | — | PA | BD | 1 | — | 2 | 2 | 71 | 120 | 2.0 | 62 | 4 | 4 | 5 |
| h | 890 | — | PA | BD | 1 | — | 2 | 2 | 67 | 155 | 3.2 | 49 | 1 | 2 | 1 |
| i | 880 | PEA 410 | PA | — | 1 | 1 | 1 | — | 62 | 188 | 4.3 | 45 | 1 | 1 | 1 |

EXAMPLE V

Artificial leathers with a surface layer were prepared from the compositions of runs 14, 15 and 16 in Example III of this invention and run h of the comparison in Example IV in accordance with method C in Example I. The properties of these artificial leathers are shown in Table 6.

Table 6 (Example V)

| Exp. No. | Polyurethane Elastomer composition | Properties of Artificial Leather ||||
|---|---|---|---|---|---|
| | | Flexibility (g) | Repulsive Elasticity (cm) | Recovery Characteristic in Curved Surface (%) | Lastability in Shoemaking (class) |
| This Invention | | | | | |
| 23 | Exp. No. 14 in Example III | 200 | 2.9 | 63 | 4 |
| 24 | Exp. No. 15 in Example III | 210 | 3.0 | 70 | 3 |
| 25 | Exp. No. 16 in Example III | 195 | 2.8 | 65 | 5 |
| Comparison | | | | | |
| j | Exp. No. h in Example IV | 310 | 4.0 | 48 | 1 |

Among the examples of this invention, test 25, using an aromatic diisocyanate and an aromatic diamine, showed the best three-dimensional curved surface formability. Tests 23 and 24 were next. But comparative run j showed poor three-dimensional curved surface formability.

EXAMPLE VI

The block copolymerdios shown in Table 7 were prepared from polyether glycols other than polytetramethyleneether glycol, poly-ε-caprolactone and phthalic acid in accordance with Example I. These block copolymerdiols and only polyether glycols and only polyester glycols were reacted with diphenylmethane-4, 4'-diisocyanate and 4, 4'-diaminodiphenylmethane to give polyurethane elastomer compositions with dimethyl formamide of 15% by weight according to the same method in any of the preceding examples.

Dyed impregnated sheets were prepared from these compositions in accordance with the method of B in Example I and had the properties shown in Table 7.

Table 7 (Example VI)

| Exp. No. | M.W. Polyether (Pe) | M.W. Polyester (Ps) | Block Copolymer Segment ||||| Content of PTMG residue (wt%) | Properties of Dyed Impregnated Sheet |||||
|---|---|---|---|---|---|---|---|---|---|---|---|---|---|---|
| | | | Dicarboxylic acid (DA) | Glycol (G) | Mol ratio ||| | | Flexibility (g) | Repulsive Elasticity (cm) | Recovery Characteristic in Curved Surface (%) | Easability in Sewing (class) | Dyeing Properties (class) ||
| | | | | | Pe | Ps | DA | G | | | | | | Spots | Cracks |
| This Invention | | | | | | | | | | | | | | | |
| 26 | PTMG 2,500 | PCL 850 | PA | — | 1 | 1 | 1 | — | 72 | 110 | 1.8 | 65 | 5 | 5 | 5 |
| Comparison | | | | | | | | | | | | | | | |
| k | PPG 2,220 | PCL 820 | PA | — | 1 | 1 | 1 | — | 0 | 220 | 4.0 | 48 | 2 | 2 | 2 |
| l | PEG 1,550 | PCL 520 | PA | — | 1 | 1 | 1 | — | 0 | 350 | 2.0 | 95 | 1 | 2 | 1 |
| m | PTMG 2,020 | — | — | — | 1 | — | — | — | 100 | 169 | 6.5 | 45 | 2 | 2 | 3 |
| n | PPG 2,010 | — | — | — | 1 | — | — | — | 0 | 195 | 5.5 | 40 | 1 | 2 | 3 |
| o | — | PEA 2,010 | — | — | — | 1 | — | — | 0 | 230 | 4.5 | 81 | 1 | 1 | 1 |
| p | — | PCL 1,960 | — | — | — | 1 | — | — | 0 | 210 | 4.0 | 78 | 1 | 1 | 1 |

Tests *k* and *l* of the comparison using polypropyleneether glycol and polyethyleneether glycol instead of polytetramethyleneether glycol were worse than test 26 of this invention in easability in sewing and dyeing properties. Tests *m* and *n* using only polyether glycols instead of the block copolymerdiol showed strong repulsive elasticity and poor easability, and still more spots on the surface. Runs *o* and *p* using only polyesters instead of the block copolymerdiol also showed poor easability and dyeing properties.

EXAMPLE VII

According to Example I, a block copolymerdiol comprising 1 mol of polytetramethyleneether glycol having a molecular weight of 2,500, 1 mol of poly-ε-caprolactone having a molecular weight of 850 and 1 mol of phthalic acid was prepared. The content of the PTMG residue in the block copolymer segment was 72% by weight. 1 mol of the resulting block copolymerdiol was reacted with 2 mols of diphenylmethane-4, 4'-diisocyanate for 2 hours at 80° C to give a linear prepolymer having two terminal isocyanate groups.

The prepolymer was dissolved in the solvents shown in Table 8 to prepare 50% solutions by weight, but solvents used in tests 32, 33 and 34 did not dissolve said prepolymer. On the other hand, in tests 27 – 31, a mixture of 1 mol of ethylene diamine and each solvent (Tests 27, 28, 29, 30, 31) was slowly added to the corresponding 50% solution to give a 25% solution. The chain extending reaction of this case proceeded quickly.

methyl formamide, dimethyl acetamide and dimethyl sulphoxide were preferable solvents and that dimethyl formamide was the most preferable solvent.

EXAMPLE VIII

A block copolymerdiol (content of PTMG residue: 72% by weight) was prepared from 1 mol of PTMG having a molecular weight of 2,500, 1 mole of poly-ε-caprolactone having a molecular weight of 850 and 1 mol of phthalic acid. According to Example VII, a linear prepolymer having two isocyanato groups at both ends was prepared from 1 mol of the block copolymer thus obtained and 2 mols of diphenylmethane-4, 4'-diisocyanate.

The resulting prepolymer was dissolved in dimethyl formamide to give a 50% solution by weight. Then a mixture of 1 mol of 4,4'-diaminodiphenylmethane and dimethyl formamide was added slowly to said 50% solution to give a 25% solution. After keeping overnight to react completely, further dimethyl formamide was added to give the polyurethane composition of this invention of 15% by weight.

Various non-woven fabrics having different densities shown in Table 9 comprising polyethylene terephthalate staple fibers of 1.25 denier were immersed in a 15.6% solution of polyvinyl alcohol and squeezed between rollers, and then dried for 1 hour at 90° C to give fixed sheets comprising by weight 100 parts of fiber and 38 parts of polyvinyl alcohol. Said fixed sheets were impregnated with the above compositions of this invention to yield dyed impregnated sheets according to method B in Example 1.

Table 8 (Example VII)

| Exp. No. | Solvent | Properties of Composition | | |
|---|---|---|---|---|
| | | Solubility of Prepolymer | Liquidity of Composition | Easiness of Impregnation |
| 27 | Dimethyl Formamide | Good | Good liquidity | Excellent |
| 28 | Dimethyl Acetamide | Good | Not so good (slightly gelled composition) | Good |
| 29 | Dimethyl Sulphoxide | Good | Good liquidity | Not so good (solidified at below 18°C) |
| 30 | Diethyl Formamide | Good | The polyurethane of High M.W. could not be obtained, so the viscosity of the composition was low. | Poor (because of low viscosity of the composition) |
| 31 | Hexamethyl Phosphoramide | Good | Poor (extremely high viscosity, gelation) | Poor |
| 32 | Dioxane | Poor | — | — |
| 33 | Tetrahydrofuran | Poor | — | — |
| 34 | o-Chlor Phenol | Poor | — | — |

It becomes clear from Table 8 that test 27 using dimethyl formamide gave the most preferable composition in terms of solubility, liquidity and ease of impregnation. Test 28 using dimethyl acetamide gave a composition which was slightly gelled, and test 29 using dimethyl sulphoxide was not preferred because of the high solidifying point (18° C; near room temperature) of dimethyl sulphoxide. Also tests 30 and 31 using diethyl formamide and hexamethyl phosphoramide were not preferred because of the low viscosity of the composition and its high cost.

It is found from the fact mentioned above that di-

Properties of each impregnated sheet are shown in Table 9. The comparative test *q* whose apparent density was above the range of this invention, showed an inflexibility and a strong rubber-like repulsive elasticity and, still more, a remarkable occurrence of cracks in dyeing because of scission of fibers. On the other hand, tests 35 – 38 of this invention showed good three-dimensional curved surface formability, especially tests 35 and 36 where the apparent density of non-woven fabric was in the range of 0.12 – 0.20 g/cm³, showed the most beautiful curved surface and never caused difficulties in dyeing.

Table 9 (Example VIII)

| Exp. No. | Number of barb | Non-Woven Fabric Number of Needling (punching/cm²) | Apparent Density (g/cm³) | Flexibility (g) | Dyed Impregnated Sheet Repulsive Elasticity (cm) | Recovery Characteristic in Curved Surface (%) | Easability in Sewing (class) | Cracks in Dyeing (class) |
|---|---|---|---|---|---|---|---|---|
| This Invention | | | | | | | | |
| 35 | 1 | 3,200 | 0.14 | 101 | 1.2 | 65 | 5 | 5 |
| 36 | 9 | 2,800 | 0.18 | 104 | 1.7 | 65 | 5 | 5 |
| 37 | 1 | 8,000 | 0.22 | 189 | 3.5 | 60 | 4 | 4 |
| 38 | 9 | 500 | 0.11 | 105 | 1.0 | 69 | 4 | 3 |
| Comparison | | | | | | | | |
| q | 9 | 120 | 0.04 | 110 | 0.9 | 75 | 2 | 1 |
| r | 1 | 12,000 | 0.27 | 310 | 6.1 | 49 | 2 | 2 |

EXAMPLE IX

Special islands-in-a-sea fibers of 3.0 denier in which 11 fine filaments of polyethyleneterephthalate are distributed in a polystyrene sea-fiber were prepared by the method described in U.S. Pat. No. 3,531,368 and cut to give staple fibers of 51 mm. Then a web was formed from the above mentioned staple fibers with a random webber and said web was processed by needle-punching at 4,800 punches/cm² with 1 barb needles to give a non-woven fabric of an apparent density of 0.18 g/cm³. Said non-woven fabric was bound with polyvinyl alcohol to give a bound sheet comprising 100 parts of fibers and 38 parts of polyvinyl alcohol in accordance with Example VIII, then the polystyrene component of said sheet was extracted by perchlorethylene to give a fixed sheet of fine polyethyleneterephthalate filaments with polyvinyl alcohol.

Said sheet was impregnated with the composition of Example VIII and obtained a dyed impregnated sheet in accordance with the method B in Example I. This impregnated sheet was extremely flexible and had a chamois-like touch. Properties of this sheet were as follows:

flexibility 98g
repulsive elasticity 0.7 cm
recovery characteristic 65%
easability in sewing class 5, especially good.

The following is claimed:

1. Sheet material comprising a needle punched non-woven fabric and a substantially linear polyurethane elastomer produced by the process of reacting
a. a linear block copolymer diol selected from the group consisting of the formula

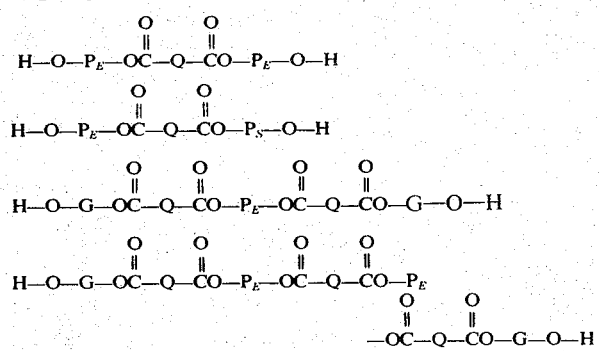
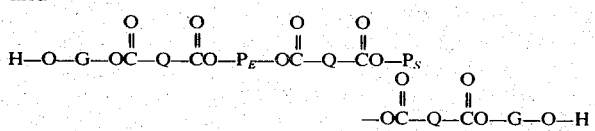

in which $-O-P_E-O-$ is a polytetramethyleneether glycol residue having a molecular weight of at least about 1,000; $-O-P_S-O-$ is a residue of polyester glycol of a molecular weight of at least about 300 and selected from the group consisting of polyesters made by the condensation of organic dicarboxylic acids and low molecular weight glycols, and polyesters made by the ring opening polymerization of lactones; $-O-G-O-$ is glycol residue having a molecular weight of below about 500;

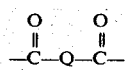

is an organic dicarboxylic acid residue selected from the group consisting of an aliphatic dicarboxylic acid having from 2 to 10 carbon atoms, aromatic dicarboxylic acid and ester formable derivatives thereof; and the weight ratio of polytetramethyleneether glycol residue ($-O-P_E-O-$) to other components in the block copolymer diol is from about 55/45 to about 95/5: with b. a molar excess of an organic diisocyanate of the formula

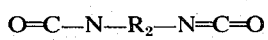

wherein $R_2$ is a residue of aliphatic or aromatic diisocyanate, and further reacting the resulting isocyanate-terminated intermediate by the reaction of (a) and (b) with c. a difunctional chain extender of the formula

wherein $R_1$ is a residue of alkylene diamine or arylene diamine or alkylene glycol or alkanol amine, the molar ratio of (a) + (c) : (b) being about 1:1.

2. Sheet material as claimed in claim 1, wherein the molecular weight of the polytetramethyleneether glycol residue which constitutes the block copolymer segment is from about 1,000 to about 4,000.

3. Sheet material as claimed in claim 1, wherein the molecular weight of the polytetramethyleneether glycol residue which constitutes the block copolymer segment is from about 1,200 to about 3,000.

4. Sheet material as claimed in claim 1, wherein the weight ratio of polytetramethyleneether glycol residue (—O—$P_E$—O—) to other components in the block copolymer diol is from about 65/35 to 95/5.

5. Sheet material as claimed in claim 1, wherein the weight ratio of polytetramethyleneether glycol residue (—O—$P_E$—O—) to other components in the block copolymer diol is from about 70/30 to 85/15.

6. Sheet material as claimed in claim 1, wherein the polyester glycol residue (—O—$P_S$—O—) is selected from the group consisting of polyethyleneadipate glycol residue, polybutylene adipate glycol residue and poly-epsilon-caprolactone glycol residue.

7. Sheet material as claimed in claim 1, wherein the organic dicarboxylic acid residue

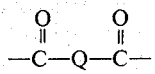

is selected from the group consisting of phthalic acid residue, terephthalic acid residue and isophthalic acid residue.

8. Sheet material as claimed in claim 1, wherein the organic diisocyanate is an aromatic diisocyanate.

9. Sheet material as claimed in claim 1, wherein the difunctional chain extender is a diamine.

10. Sheet material as claimed in claim 1, wherein the difunctional chain extender is aromatic diamine.

11. Sheet material as claimed in claim 1, wherein the organic diisocyanate and the chain extender are diphenylmethane-4,4'-diisocyanate and 4,4'-diaminodiphenylmethane respectively.

12. Sheet material as claimed in claim 1, wherein the needle punch density of said non-woven fabric is from 200 to 10,000 punches/cm².

13. Sheet material as claimed in claim 1, wherein the needle punched non-woven fabric has a thickness of from about 0.5 to about 2.0 mm and an apparent density of from about 0.05 to about 0.25 g/cm³.

14. Sheet material as claimed in claim 1, wherein the needle punched non-woven fabric has a thickness of from about 0.5 to about 2.0 mm and an apparent density of from about 0.12 to about 0.20 g/cm³.

15. Sheet material as claimed in claim 1, wherein the fiber constituting the needle punched non-woven fabric comprises a bundle of at least five filaments one of which is from about 0.01 to about 0.5 in denier.

16. A process for preparing artificial leather comprising impregnating needle punched non-woven fabric with a composition comprising a polyurethane elastomer and a solvent, the content of polyurethane elastomer of this composition being from about 5 to 25% by weight, said polyurethane elastomer being produced by the process of reacting a. a linear block copolymer diol selected from the group consisting of the formula

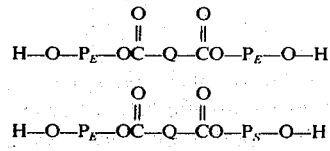

in which —O—$P_E$—O— is a polytetramethyleneether glycol residue having a molecular weight of at least about 1,000; —O—$P_S$—O— is a residue of polyester glycol of a molecular weight of at least about 300 and selected from the group consisting of polyesters made by the condensation of organic dicarboxylic acids and low molecular weight glycols, and polyesters made by the ring opening polymerization of lactones;

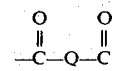

is an organic dicarboxylic acid residue selected from the group consisting of an aliphatic dicarboxylic acid having from 2 to 10 carbon atoms, aromatic dicarboxylic acid and ester formable derivatives thereof; and the weight ratio of polytetramethyleneether glycol residue (—O—$P_E$—O) to other components in the block copolymer diol is from about 55/45 to about 95/5; with b. a molar excess of an organic diisocyanate of the formula

wherein $R_2$ is a residue of aliphatic or aromatic diisocyanate, and further reacting the resulting isocyanate-terminated intermediate by the reaction of (a) and (b) with c. a difunctional chain extender of the formula

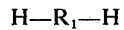

wherein $R_1$ is a residue of alkylene diamine or arylene diamine or alkylene glycol or alkanol amine, the molar ration of (a) + (c) : (b) being about 1:1, wherein the block copolymer diol is produced by the process of reacting d. 2 mols of polytetramethyleneether glycol of the formula

wherein —O—$P_E$—O— is a residue of polytetramethyleneether glycol and have a molecular weight of at least about 1,000, or 1 mol of said polytetramethyleneether glycol and 1 mol of polyester glycol of the formula

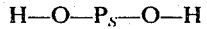

wherein —O—$P_S$—O— is a residue of polyester glycol of a molecular weight of at least about 300 and selected from the group consisting of polyesters made by the condensation of organic dicarboxylic acid and low molecular weight glycol, and polyesters made by the ring opening polymerization of lactones, with e. 1 mol of organic dicarboxylic acid of the formula

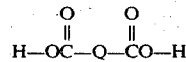

wherein $$-\overset{O}{\underset{\|}{C}}-Q-\overset{O}{\underset{\|}{C}}-$$

is a residue of an organic dicarboxylic acid selected from the group consisting of an aliphatic dicarboxylic acid having from 2 to 10 carbon atoms, aromatic dicarboxylic acid and ester formable derivatives thereof, initially at 80°–150° C, after that at 180°–250° C, and finally under reduced pressure.

17. A process for preparing artificial leather as claimed in claim 16, wherein the organic solvent of polyurethane elastomer is dimethyl formamide.

18. A process for preparing artificial leather comprising impregnating needle punched non-woven fabric with a composition comprising polyurethane elastomer and a solvent, the content of polyurethane elastomer of this composition being from about 5 to 25% by weight, said polyurethane elastomer being produced by the process of reacting a. a linear block copolymer diol $$H-O-G-\overset{O}{\underset{\|}{OC}}-Q-\overset{O}{\underset{\|}{CO}}-P_E-\overset{O}{\underset{\|}{OC}}-Q-\overset{O}{\underset{\|}{CO}}-G-O-H$$

in which $-O-P_E-O-$ is a polytetramethyleneether glycol residue having a molecular weight of at least about 1,000; $-O-G-O-$ is glycol residue having a molecular weight of below about 500;

$$-\overset{O}{\underset{\|}{C}}-Q-\overset{O}{\underset{\|}{C}}-$$

is an organic dicarboxylic acid residue selected from the group consisting of an aliphatic dicarboxylic acid having from 2 to 10 carbon atoms, aromatic dicarboxylic acid and ester fromable derivatives thereof; and the weight ratio of polytetramethyleneether glycol residue ($O-P_E-O$) to other components in the block copolymer diol is from about 55/45 to about 95/5: with b. a molar excess of an organic diisocyanate of the formula $$O=C=N-R_2-N=C=O$$

wherein $R_2$ is a residue of aliphatic or aromatic diisocyanate, and further reacting the resulting isocyanate-terminated intermediate by the reaction of (a) and (b) with c. a difunctional chain extender of the formula $$H-R_1-H$$

wherein $R_1$ is a residue of alkylene diamine or arylene diamine or alkylene glycol or alkanol amine, the molar ratio of (a) + (c) : (b) being about 1:1, wherein the block copolymer diol is produced by the process of reacting d. 1 mol of polytetramethyleneether glycol of the formula $$H-O-P_E-O-H$$

wherein $-O-P_E-O-$ is a residue of polytetramethyleneether glycol and having a molecular weight of at least about 1,000 with e. 2 mols of organic dicarboxylic acid of the formula $$H-\overset{O}{\underset{\|}{OC}}-Q-\overset{O}{\underset{\|}{CO}}-H$$

wherein $$-\overset{O}{\underset{\|}{C}}-Q-\overset{O}{\underset{\|}{C}}-$$

is a residue of an organic dicarboxylic acid selected from the group consisting of an aliphatic dicarboxylic acid having from 2 to 10 carbon atoms, aromatic dicarboxylic acid and ester formable derivatives thereof, initially at 80°–150° C, after that at 180°–250° C, and finally under reduced pressure, and then reacting with f. 2 mols of glycol of the formula $$H-O-G-O-H$$

wherein $-O-G-O-$ is a residue of glycol having a molecular weight of below about 500, at 180°–250° C, and finally under reduced pressure 19. A process for preparing artificial leather comprising impregnating needle punched non-woven fabric with a composition comprising polyurethane elastomer and a solvent, the content of polyurethane elastomer of this composition being from about 5 to 25% by weight, said polyurethane elastomer being produced by the process of reacting a. a linear block copolymer diol selected from the group consiting of the formula $$H-O-G-\overset{O}{\underset{\|}{OC}}-Q-\overset{O}{\underset{\|}{CO}}-P_E-\overset{O}{\underset{\|}{OC}}-Q-\overset{O}{\underset{\|}{CO}}-P_E-\overset{O}{\underset{\|}{OC}}-Q-\overset{O}{\underset{\|}{CO}}-G-O-H$$

and $$H-O-G-\overset{O}{\underset{\|}{OC}}-Q-\overset{O}{\underset{\|}{CO}}-P_E-\overset{O}{\underset{\|}{OC}}-Q-\overset{O}{\underset{\|}{CO}}-P_S-\overset{O}{\underset{\|}{OC}}-Q-\overset{O}{\underset{\|}{CO}}-G-O-H$$

in which $-O-P_E-O-$ is a polytetramethyleneether glycol residue having a molecular weight of at least about 1,000; $-O-P_S-O-$ is a residue of polyester glycol of a molecular weight of at least about 300 selected from the group consisting of polyesters made by the condensation of organic dicarboxylic acids and low molecular weight glycols, and polyesters made by the ring opening polymerization of lactones; $-O-G-O-$ is glycol residue having a molecular weight of below about 500;

$$-\overset{O}{\underset{\|}{C}}-Q-\overset{O}{\underset{\|}{C}}-$$

is an organic dicarboxylic acid residue selected from the group consiting of an aliphatic dicarboxylic acid having from 2 to 10 carbon atoms, aromatic dicarboxylic acid and ester formable derivative thereof; and the weight ratio of polytetramethyleneether glycol residue (—O—P$_E$—O) to other components in the block copolymer diol is from about 55/45 to about 95/5: with b. a molar excess of an organic diisocyanate of the formula

O=C—N—R$_2$—N=C=O wherein R$_2$ is a residue of aliphatic or aromatic diisocyanate, and further reacting the resulting isocyanate-terminated intermediate by the reaction of (a) and (b) with c. a difunctional chain extender of the formula

H—R$_1$—H wherein R$_1$ is a residue of alkylene diamine or arylene diamine or alkylene glycol or alkanol amine, the molar ration of (a) + (c):(b) being about 1:1, wherein the block copolymer diol is produced by the process of reacting d. 2 mols of polytetramethyleneether glycol of the formula

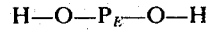
H—O—P$_E$—O—H wherein —O—P$_E$—O— is a residue of polytetramethyleneether glycol and have a molecular weight of at least about 1,000, or 1 mol of said polytetramethyleneether glycol and 1 mol of polyester glycol of the formula

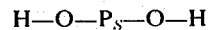
H—O—P$_S$—O—H wherein —O—P$_S$—O— is a residue of polyester glycol of a molecular weight of at least about 300 and selected from the group consisting of polyesters made by the condensation of organic dicarboxylic acids and low molecular weight glycols, and polyesters made by the ring opening polymerization of lactones, with e. 3 mols of organic dicarboxylic acid of the formula

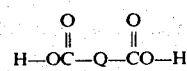
$$H-\overset{O}{\underset{\|}{O C}}-Q-\overset{O}{\underset{\|}{C O}}-H$$

wherein

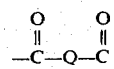
$$-\overset{O}{\underset{\|}{C}}-Q-\overset{O}{\underset{\|}{C}}-$$

is a residue of an organic dicarboxylic acid selected from the group consisting of an aliphatic dicarboxylic acid having from 2 to 10 carbon atoms, aromatic dicarboxylic acid and ester formable derivatives thereof, initially at 80° – 150° C, after that at 180° – 250° C, and finally under reduced pressure, and then reacting with f. 2 mols of glycol of the formula

H—O—G—O—H wherein —O—G—O— is a residue of glycol having a molecular weight of below about 500, at 180° – 250° C, and finally under reduced pressure.

20. A process for preparing artificial leather comprising impregnating needle punched non-woven fabric with a composition comprising polyurethane elastomer and a solvent, the content of polyurethane elastomer of this composition being from about 5 to 25% by weight, said polyurethane elastomer being produced by the process of reacting a. a linear block copolymer diol selected from the group consisting of the formula

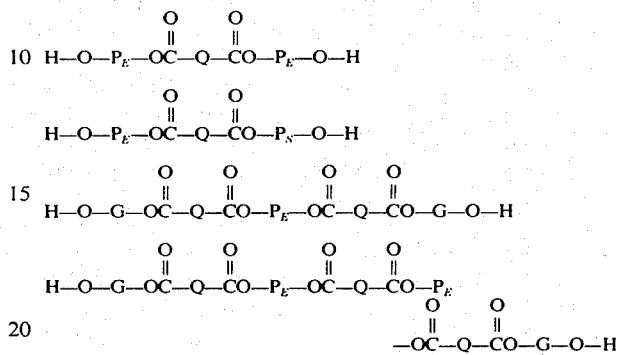

and

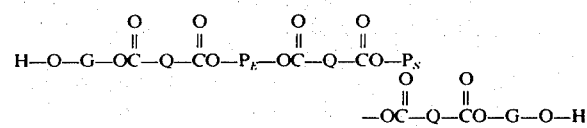

in which —O—P$_E$—O— is a polytetramethyleneether glycol residue having a molecular weight of at least about 1,000; —O—P$_S$—O— is a residue of polyester glycol of a molecular weight of at least about 300 and selected from the group consisting of polyesters made by the condensation of organic dicarboxylic acids and low molecular weight glycols, and polyesters made by the ring opening polymerization of lactones; —O—G—O— is glycol residue having a molecular weight of below about 500;

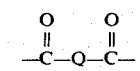
$$-\overset{O}{\underset{\|}{C}}-Q-\overset{O}{\underset{\|}{C}}-$$

is an organic dicarboxylic acid residue selected from the group consisting of an aliphatic dicarboxylic acid having from 2 to 20 carbon atoms, aromatic dicarboxylic acid and ester formable derivatives thereof; and the weight ratio of polytetramethyleneether glycol residue (—O—P$_E$—O) to other components in the block copolymer diol is from about 55/45 to about 95/5: with b. a molar excess of an organic diisocyanate of the formula

O=C—N—R$_2$—N=C=O wherein R$_2$ is a residue of aliphatic or aromatic diisocyanate, and further reacting the resulting isocyanate-terminated intermediate by the reaction of (a) and (b) with c. a difunctional chain extender of the formula

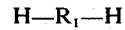
H—R$_1$—H wherein R$_1$ is a residue of alkylene diamine or arylene diamine or alkylene glycol or alkanol amine, the molar ratio of (a) + (c):(b) being about 1:1, wherein the non-woven fabric is immersed in a solution of a water-soluble binder and set with the water-soluble binder by drying, then impregnated with the polyurethane elastomer composition, and thereafter said water-soluble binder is extracted.

21. A process for preparing artificial leather as claimed in claim 20, wherein the needle punched nonwoven fabric comprises an islands-in-a-sea fiber comprising at least two different polymers, the number of said islands being at least 5, wherein the fabric is set with a water-soluble binder, then the sea polymer component is extracted with a solvent which is a solvent for the sea component but is a non-solvent for the islands component and the water-soluble binder, and then is impregnated with the polyurethane elastomer composition.

22. A process for preparing artificial leather as claimed in claim 20, wherein the water-soluble binder comprises from about 5 to about 25% of the total weight of the solution and the ratio of impregnated binder weight to the non-woven fabric weight is from about 5/100 to about 100/100.

23. A process for preparing artificial leather comprising coating a substrate made by non-woven fabric with a composition comprising polyurethane elastomer and a solvent, said polyurethane elastomer being produced by the process of reacting a. a linear block copolymer diol selected from the group consisting of the formula $$H-O-P_E-OC-Q-CO-P_E-O-H$$
$$H-O-P_E-OC-Q-CO-P_S-O-H$$

in which $-O-P_E-O-$ is a polytetramethyleneether glycol residue having a molecular weight of at least about 1,000; $-O-P_S-O-$ is a residue of polyester glycol of a molecular weight of at least about 300 and selected from the group consisting of polyesters made by the condensation of organic dicarboxylic acids and low molecular weight glycols, and polyesters made by the ring opening polymerization of lactones;

$$-C-Q-C-$$

is an organic dicarboxylic acid residue selected from the group consisting of an aliphatic dicarboxylic acid having from 2 to 10 carbon atoms, aromatic dicarboxylic acid and ester formable derivative thereof; and the weight ratio of polytetramethyleneether glycol residue ($-O-P_E-O$) to other components in the block copolymer diol is from about 55/45 to about 95/5; with b. a molar excess of an organic diisocyanate of the formula $$O=C-N-R_2-N=C=O$$

wherein $R_2$ is a residue of aliphatic or aromatic diisocyanate, and further reacting the resulting isocyanate-termined intermediate by the reaction of (a) and (b) with c. a difunctional chain extender of the formula $$H-R_1-H$$

wherein $R_1$ is a residue of alkylene diamine or arylene diamine or alkylene glycol or alkanol amine, the molar ratio of (a) + (c):(b) being about 1:1, wherein the block copolymer diol is produced by the process of reacting d. 2 mols of polytetramethyleneether glycol of the formula $$H-O-P_E-O-H$$

wherein $-O-P_E-O-$ is a residue of polytetramethyleneether glycol and have a molecular weight of at least about 1,000, or 1 mol of said polytetramethyleneether glycol and 1 mol of polyester glycol of the formula $$H-O-P_S-O-H$$

wherein $-O-P_S-O-$ is a residue of polyester glycol of a molecular weight of at least about 300 and selected from the group consisting of a polyester made by the condensation of organic dicarboxylic acid and low molecular weight glycol, and polyesters made by the ring opening polymerization of lactones, with e. 1 mol of organic dicarboxylic acid of the formula $$H-OC-Q-CO-H$$

wherein $$-C-Q-C-$$

is a residue of an organic dicarboxylic acid selected from the group consisting of an aliphatic dicarboxylic acid having from 2 to 10 carbon atoms, aromatic dicarboxylic acid and ester formable derivatives thereof, initially at 80° – 150° C, after that at 180° – 250° C, and finally under reduced pressure.

24. A process for preparing artificial leather comprising coating a substrate made by non-woven fabric with a composition comprising polyurethane elastomer and a solvent, said polyurethane being produced by the process of reacting a. a linear block copolymer diol $$H-O-G-OC-Q-CO-P_E-OC-Q-CO-P_S-OC-Q-CO-G-O-H$$

in which $-O-P_E-O-$ is a polytetramethyleneether glycol residue having a molecular weight of at least about 1,000; $-O-P_S-O-$ is a residue of polyester glycol of a molecular weight of at least about 300 and selected from the group consisting of polyesters made by the condensation of organic dicarboxylic acids and low molecular weight glycols, and polyesters made by the ring opening polymerization of lactones; $-O-G-O-$ is glycol residue having a molecular weight of below about 500;

$$-C-Q-C-$$

is an organic dicarboxylic acid residue selected from the group consisting of an aliphatic dicarboxylic acid having from 2 to 10 carbon atoms, aromatic dicarboxylic acid and ester formable derivatives thereof; and the weight ratio of polytetramethyleneether glycol residue ($-O-P_E-O-$) to other components in the block copolymer diol is from about 55/45 to about 95/5: with b. a molar excess of an organic diisocyanate of the formual $$O=C=N-R_2-N=C=O$$

wherein $R_2$ is a residue of aliphatic or aromatic diisocyanate. and further reacting the resulting isocyanate-terminated intermediate by the reaction of (a) and (b) with c. a difunctional chain extender of the formula $$H-R_1-H$$

wherein $R_1$ is a residue of alkylene diamine or arylene diamine or alkylene glycol or alkanol amine, the molar ratio of (a) + (c):(b) being about 1:1, wherein the block copolymer diol is produced by the process of reacting d. 1 mol of polytetramethyleneether glycol of the formula $$H-O-P_E-O-H$$

wherein $-O-P_E-O-$ is a residue of polytetramethyleneether glycol and have a molecular weight of at least about 1,000, with e. 2 mols of organic dicarboxylic acid of the formula $$H-\overset{O}{\overset{\|}{OC}}-Q-\overset{O}{\overset{\|}{CO}}-H$$

wherein $$-\overset{O}{\overset{\|}{C}}-Q-\overset{O}{\overset{\|}{C}}-$$

is a residue of an organic dicarboxylic acid selected from the group consisting of an aliphatic dicarboxylic acid having from 2 to 10 carbon atoms, aromatic dicarboxylic acid and ester formable derivative thereof, initially at 80° – 150° C, after that at 180° – 250° C, and finally under reduced pressure, and then reacting with f. 2 mols of glycol of the formula $$H-O-G-O-H$$

wherein $-O-G-O$ is a residue of glycol having a molecular weight of below about 500, at 180° – 250° C, and finally under reduced pressure.

25. A process for preparing artificial leather comprising coating a substrate made of non-woven fabric with a composition comprising polyurethane elastomer and a solvent, said polyurethane elastomer being produced by the process of reacting a. a linear block copolymer diol selected from the group consisting of the formula $$H-O-G-\overset{O}{\overset{\|}{OC}}-Q-\overset{O}{\overset{\|}{CO}}-P_E-\overset{O}{\overset{\|}{OC}}-Q-\overset{O}{\overset{\|}{CO}}-P_E$$
$$-\overset{O}{\overset{\|}{OC}}-Q-\overset{O}{\overset{\|}{CO}}-H-O-H$$

and $$H-O-G-\overset{O}{\overset{\|}{OC}}-Q-\overset{O}{\overset{\|}{CO}}-P_E-\overset{O}{\overset{\|}{OC}}-Q-\overset{O}{\overset{\|}{CO}}-P_S$$
$$-\overset{O}{\overset{\|}{OC}}-Q-\overset{O}{\overset{\|}{CO}}-G-O-H$$

in which $-O-P_E-O-$ is a polytetramethyleneether glycol residue having a molecular weight of at least about 1,000; $-O-P_S-O-$ is a residue of polyester glycol of a molecular weight of at least about 300 and selected from the group consisting of polyesters made by the condensation of organic dicarboxylic acids and low molecular weight glycols, and polyesters made by the ring opening polymerization of lactones; $-O-G-O-$ is glycol residue having a molecular weight of below about 500; -C-Q-C- is an organic dicarboxylic acid residue selected from the group consisting of an aliphatic dicarboxylic acid having from 2 to 10 carbon atoms, aromatic dicarboxylic acid and ester formable derivatives thereof; and the weight ratio of polytetramethyleneether glycol residue ($-O-P_E-O$) to other components in the block copolymer diol is from about 55/45 to about 95/5: with b. a molar excess of an organic diisocyanate of the formula $$O=C=N-R_2-N=C=O$$

wherein $R_2$ is a residue of aliphatic or aromatic diisocyanate, and further reacting the resulting isocyanate-terminated intermediate by the reaction of (a) and (b) with c. a difunctional chain extender of the formula $$H-R_1-H$$

wherein $R_1$ is a residue of alkylene diamine or arylene diamine or alkylene glycol or alkanol amine, the molar ratio of (a) + (c):(b) being about 1:1, wherein the block copolymer diol is produced by the process of reacting d. 2 mols of polytetramethyleneether glycol of the formula $$H-O-P_E-O-H$$

wherein $-O-P_E-O-$ is a residue of polytetramethyleneether glycol and have a molecular weight of at least about 1,000, or 1 mol of said polytetramethyleneether glycol and 1 mol of polyester glycol of the formula $$H-O-P_S-O-H$$

wherein $-O-P_S-O-$ is a residue of polyester glycol of a molecular weight of at least about 300 and selected from the group consisting of a polyester made by the condensation of organic dicarboxylic acid and low molecular weight glycol, and polyesters made by the ring opening polymerization of lactones, with e. 3 mols of organic dicarboxylic acid of the formula $$H-\overset{O}{\overset{\|}{OC}}-Q-\overset{O}{\overset{\|}{CO}}-H$$

wherein

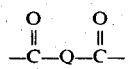

is a residue of an organic dicarboxylic acid selected from the group consisting of an aliphatic dicarboxylic acid having from 2 to 10 carbon atoms, aromatic dicarboxylic acid and ester formable derivatives thereof, initially at 80° – 150° C, after that at 180° – 250° C, and finally uner reduced pressure, and then reacting with f. 2 mols of glycol of the formula

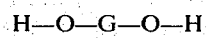

wherein —O—G—O— is a residue of glycol having a molecular weight of below about 500, at 180° – 250° C, and finally under reduced pressure.

* * * * *